(12) United States Patent
Lin et al.

(10) Patent No.: US 11,345,638 B2
(45) Date of Patent: May 31, 2022

(54) TITANIUM NITRIDE-REINFORCED ZIRCONIA TOUGHENED ALUMINA CERAMIC POWDER AND PREPARATION METHOD THEREOF

(71) Applicant: China Nonferrous Metals (Guilin) Geology And Mining Co., Ltd., Guilin (CN)

(72) Inventors: Feng Lin, Guilin (CN); Chao Chen, Guilin (CN); Zhigang Xie, Guilin (CN); Peicheng Mo, Guilin (CN); Jiarong Chen, Guilin (CN)

(73) Assignee: CHINA NONFERROUS METALS (GUILIN) GEOLOGY AND MINING CO., LTD., Guilin (CN)

(*) Notice: Subject to any disclaimer, the term of this patent is extended or adjusted under 35 U.S.C. 154(b) by 0 days.

(21) Appl. No.: 16/837,001

(22) Filed: Apr. 1, 2020

(65) Prior Publication Data
US 2020/0308057 A1 Oct. 1, 2020

(51) Int. Cl.
  *C04B 35/106* (2006.01)
  *C04B 35/626* (2006.01)
(52) U.S. Cl.
  CPC ........ *C04B 35/106* (2013.01); *C04B 35/6265* (2013.01); *C04B 35/62635* (2013.01); *C04B 35/62655* (2013.01); *C04B 35/62675* (2013.01)

(58) Field of Classification Search
  CPC ............ C04B 35/106; C04B 35/62635; C04B 35/6265; C04B 35/62655; C04B 35/62675
  See application file for complete search history.

(56) References Cited

U.S. PATENT DOCUMENTS

| 4,605,631 A * | 8/1986 | Rossi | C01F 7/34 423/266 |
| 2015/0137026 A1 * | 5/2015 | Engler | C01B 21/064 252/75 |

* cited by examiner

*Primary Examiner* — Karl E Group
*Assistant Examiner* — Cameron K Miller
(74) *Attorney, Agent, or Firm* — ArentFox Schiff LLP; Michael Fainberg

(57) ABSTRACT

The present invention provides titanium nitride-reinforced zirconia toughened alumina (ZTA) ceramic powder and a preparation method thereof, and belongs to the technical field of ceramic materials. The preparation method provided in the present invention includes the following steps: mixing an aluminum salt, a zirconium salt, a yttrium salt, and a titanium salt with water to obtain a mixed aqueous solution, where the aluminum salt, the zirconium salt, the yttrium salt, and the titanium salt are water-soluble inorganic salts; mixing the obtained mixed aqueous solution and an alkaline precipitant for precipitation, to obtain hydroxide precipitate powder; successively conducting first calcination and second calcination on the obtained hydroxide precipitate powder, to obtain oxide solid solution powder; and subjecting the obtained oxide solid solution powder to selective nitridation reaction, to obtain titanium nitride-reinforced ZTA ceramic powder.

8 Claims, 1 Drawing Sheet

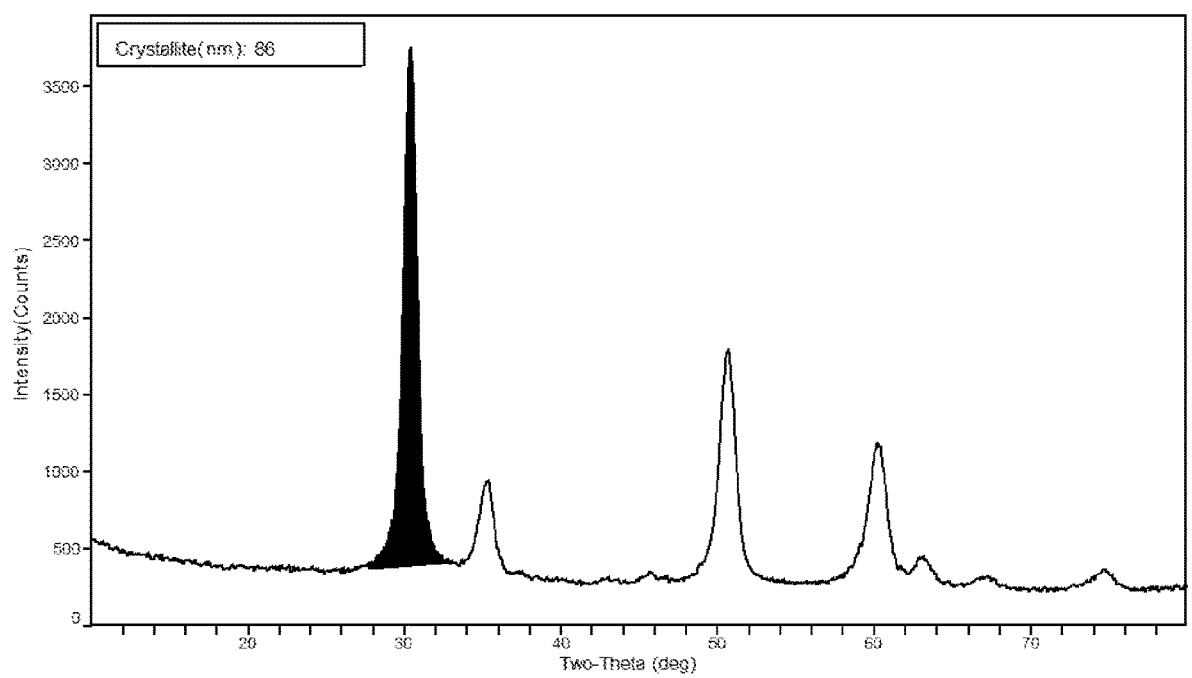

TITANIUM NITRIDE-REINFORCED ZIRCONIA TOUGHENED ALUMINA CERAMIC POWDER AND PREPARATION METHOD THEREOF

CROSS-REFERENCE TO RELATED APPLICATIONS

This application claims priority to Chinese Patent Application No. 201910256723.0 filed on Apr. 1, 2019, the entire contents of which is hereby incorporated by reference.

TECHNICAL FIELD

The present invention relates to the technical field of ceramic materials, and in particular, to titanium nitride-reinforced zirconia toughened alumina (ZTA) ceramic powder and a preparation method thereof.

BACKGROUND

Mechanical, electrical, and optical properties, etc. of a material are not only dependent on properties of the components of the material, but also closely related to macroscopic and microscopic structures between the material components. In recent years, preparation technologies of advanced ceramic materials have become more refined and micro-controllable. These technologies mainly focus on molecular and atomic composite for ceramic materials and material preparation based on solid solution. During the study of advanced ceramic materials, material preparation and material modification technologies related to solid solution systems include solid solution strengthening, solid solution doping, solid-solution phase splitting, solid solution-based selective reaction, etc. These technologies are important methods for microstructure design.

A ZTA ceramic material has good mechanical properties. The strength and toughness of the ZTA ceramic material can be adjusted by adjusting the doping amount of $Y_2O_3$. Moreover, grain size control, phase transition inhibition, and a material densification function of the ZTA ceramic material can be adjusted based on the content of $Al_2O_3$. However, the application of the ZTA ceramic material is limited due to its low hardness and poor electrical conductivity.

SUMMARY

In view of this, an objective of the present invention is to provide titanium nitride-reinforced ZTA ceramic powder and a preparation method thereof. A ceramic material prepared by hot-pressing sintering of the titanium nitride-reinforced ZTA ceramic powder provided in the present invention has high hardness and good electrical conductivity.

The present invention provides a preparation method of titanium nitride-reinforced ZTA ceramic powder, including the following steps:

(1) mixing an aluminum salt, a zirconium salt, a yttrium salt, and a titanium salt with water to obtain a mixed aqueous solution, where the aluminum salt, the zirconium salt, the yttrium salt, and the titanium salt are water-soluble inorganic salts;

(2) mixing the mixed aqueous solution obtained in step (1) and an alkaline precipitant for precipitation, to obtain hydroxide precipitate powder;

(3) successively conducting first calcination and second calcination on the hydroxide precipitate powder obtained in step (2), to obtain oxide solid solution powder, where the temperature of the first calcination is 700-850° C. and the time of the first calcination is 6-12 h; and the temperature of the second calcination is 900-1000° C. and the time of the second calcination is 1-3 h; and (4) subjecting the oxide solid solution powder obtained in step (3) to selective nitridation reaction, to obtain titanium nitride-reinforced ZTA ceramic powder.

Preferably, in step (1), the aluminum salt includes aluminum chloride, aluminum sulfate, or aluminum nitrate; the zirconium salt includes zirconium oxychloride or zirconium citrate; the yttrium salt includes yttrium chloride, yttrium nitrate, or yttrium sulfate; and the titanium salt includes titanium sulfate, titanium chloride, or titanium nitrate.

Preferably, in step (1), a molar ratio of aluminum in the aluminum salt, zirconium in the zirconium salt, yttrium in the yttrium salt, and titanium in the titanium salt is (10-30):(30-70):(0.4-1):(5-20).

Preferably, in step (2), the alkaline precipitant is ammonia water or ammonium chloride.

Preferably, after precipitation, step (2) further includes conducting solid-liquid separation on the system, and drying a solid substance obtained after solid-liquid separation, to obtain the hydroxide precipitate powder.

Preferably, the drying temperature is 75-85° C.

Preferably, the temperature of the selective nitridation reaction in step (4) is 800-1200° C.

The present invention further provides the titanium nitride-reinforced ZTA ceramic powder prepared by the preparation method mentioned above.

Beneficial technical effects: The present invention provides titanium nitride-reinforced ZTA ceramic powder and a preparation method thereof. The preparation method includes the following steps: mixing an aluminum salt, a zirconium salt, a yttrium salt, and a titanium salt with water to obtain a mixed aqueous solution, where the aluminum salt, the zirconium salt, the yttrium salt, and the titanium salt are water-soluble inorganic salts; mixing the obtained mixed aqueous solution and an alkaline precipitant for precipitation, to obtain hydroxide precipitate powder; successively conducting first calcination and second calcination on the obtained hydroxide precipitate powder, to obtain oxide solid solution powder, where the temperature of the first calcination is 700-850° C. and the time of the first calcination is 6-12 h; and the temperature of the second calcination is 900-1000° C. and the time of the second calcination is 1-3 h; and subjecting the obtained oxide solid solution powder to selective nitridation reaction, to obtain titanium nitride-reinforced ZTA ceramic powder. In the present invention, titanium nitride is introduced into a ZTA ceramic material. On one hand, the abrasion resistance and hardness of the ZTA ceramic material are improved by using a high melting point and high hardness of titanium nitride, to achieve a reinforcing and toughening effect. On the other hand, the conductivity of the ceramic powder is enhanced by using high conductivity of titanium nitride. In the present invention, instead of directly mixing titanium nitride powder and ZTA ceramic powder mechanically and conducting sintering, raw material molecules are mixed and calcined to obtain an oxide, and titanium nitride-reinforced ZTA ceramic powder is synthesized in situ by selective nitridation. In this way, inhomogeneity of a microstructure in a multiphase material can be effectively reduced, and the physical and chemical compatibility between a second phase and a matrix can be improved, thereby improving the thermal stability of the material.

BRIEF DESCRIPTION OF DRAWING

FIG. 1 is an X-ray diffraction pattern of titanium nitride-reinforced ZTA ceramic powder prepared in Embodiment 1.

DETAILED DESCRIPTION

The present invention provides a preparation method of titanium nitride-reinforced ZTA ceramic powder, including the following steps:

(1) mixing an aluminum salt, a zirconium salt, a yttrium salt, and a titanium salt with water to obtain a mixed aqueous solution, where the aluminum salt, the zirconium salt, the yttrium salt, and the titanium salt are water-soluble inorganic salts;

(2) mixing the mixed aqueous solution obtained in step (1) and an alkaline precipitant for precipitation, to obtain hydroxide precipitate powder;

(3) successively conducting first calcination and second calcination on the hydroxide precipitate powder obtained in step (2), to obtain oxide solid solution powder, where the temperature of the first calcination is 700-850° C. and the time of the first calcination is 6-12 h; and the temperature of the second calcination is 900-1000° C. and the time of the second calcination is 1-3 h; and (4) subjecting the oxide solid solution powder obtained in step (3) to selective nitridation reaction, to obtain titanium nitride-reinforced ZTA ceramic powder.

In the present invention, an aluminum salt, a zirconium salt, a yttrium salt, and a titanium salt are mixed with water to obtain a mixed aqueous solution, where the aluminum salt, the zirconium salt, the yttrium salt, and the titanium salt are water-soluble inorganic salts.

In the present invention, the aluminum salt preferably includes aluminum chloride, aluminum sulfate, or aluminum nitrate; the zirconium salt preferably includes zirconium oxychloride or zirconium citrate; the yttrium salt preferably includes yttrium chloride, yttrium nitrate, or yttrium sulfate; and the titanium salt preferably includes titanium sulfate, titanium chloride, or titanium nitrate.

In the present invention, a molar ratio of aluminum in the aluminum salt, zirconium in the zirconium salt, yttrium in the yttrium salt, and titanium in the titanium salt is preferably (10-30):(30-70):(0.4-1):(5-20) and more preferably (15-25):(40-50):(0.5-0.8):(10-15).

In the present invention, there is no special limitation on a dosage of water; and any dosage that is well known to persons skilled in the art and can make all of the aluminum salt, the zirconium salt, the yttrium salt, and the titanium salt dissolved may be chosen.

In the present invention, there is no special limitation on a mixing method; and any mixing method well known to persons skilled in the art may be chosen.

In the present invention, after the mixed aqueous solution is obtained, the mixed aqueous solution and an alkaline precipitant are mixed for precipitation, to obtain hydroxide precipitate powder.

In the present invention, the alkaline precipitant is preferably ammonia water or ammonium chloride. In the present invention, there is no special limitation on a dosage of the alkaline precipitant; and any dosage that can make positive ions of the aluminum salt, the zirconium salt, the yttrium salt, and the titanium salt completely precipitated may be chosen.

In the present invention, there is no special limitation on a method for mixing the mixed aqueous solution and the alkaline precipitant; and any mixing method well known to persons skilled in the art may be chosen. In an embodiment of the present invention, the mixing method is preferably mixing under stirring. In the present invention, there are no special limitations on a stirring speed and the stirring time; and any stirring speed and time well known to persons skilled in the art may be chosen. In the present invention, the mixing time is the precipitation time.

In the present invention, after precipitation, the method preferably further includes conducting solid-liquid separation on the system, and drying a solid substance obtained after solid-liquid separation, to obtain the hydroxide precipitate powder.

In the present invention, the hydroxide precipitate powder includes Al(OH)3, Zr(OH)2, Y2(OH)3, and Ti(OH)2.

In the present invention, there is no special limitation on a solid-liquid separation method; and any solid-liquid separation method well known to persons skilled in the art may be chosen, for example, filtering.

In the present invention, the drying temperature is preferably 75-85° C. In the present invention, there is no special limitation on the drying time, provided that drying to a constant weight is conducted.

In the present invention, before drying, the method preferably further includes successively conducting water washing and alcohol washing on the solid substance obtained after solid-liquid separation. In the present invention, there is no special limitation on the water washing method; and any water washing method well known by persons skilled in the art may be chosen. In the present invention, water washing is conducted to remove impurity ions in the reactants. In the present invention, alcohol washing is preferably washing with anhydrous ethanol. In the present invention, there is no special limitation on a method for washing with anhydrous ethanol; and any washing method well known by persons skilled in the art may be chosen. In the present invention, alcohol washing is conducted to remove water and eliminate bridged oxygen bonds formed between colloidal particles through water molecules, so as to avoid hard agglomeration of the powder during calcination.

In the present invention, after the hydroxide precipitate powder is obtained, first calcination and second calcination are successively conducted on the hydroxide precipitate powder, to obtain oxide solid solution powder, where the temperature of the first calcination is 700-850° C. and the time of the first calcination is 6-12 h; and the temperature of the second calcination is 900-1000° C. and the time of the second calcination is 1-3 h.

In the present invention, the temperature of the first calcination is 700-850° C. and is preferably 750-800° C.; and the time of the first calcination is 6-12 h and is preferably 8-10 h. In the present invention, calcination is preferably conducted by heating from room temperature to the time of the first calcination. In the present invention, there is no special limitation on a heating rate; and any heating rate well known to persons skilled in the art may be chosen. In the present invention, the first calcination is conducted to transform $Al(OH)_3$, $Zr(OH)_2$, $Y_2(OH)_3$, and $Ti(OH)_2$ in the hydroxide precipitate powder to $Al_2O_3$, $ZrO_2$, $Y_2O_3$, and $TiO_2$.

In the present invention, the temperature of the second calcination is 900-1000° C. and is preferably 950-980° C.; and the time of the second calcination is 1-3 h and is preferably 1.5-5 h. In the present invention, the second calcination is preferably conducted by heating from the temperature of the first calcination to the temperature of the second calcination. In the present invention, there is no special limitation on a heating rate; and any heating rate well known to persons skilled in the art may be chosen. In the present invention, through the second calcination, $Al_2O_3$ and $ZrO_2$ are fully cocrystallized to form a solid solution; all ions $Ti^{4+}$ and $Y^{3+}$ enter into alumina and zirconia lattices; and $Y_2O_3$ can stabilize tetragonal zirconia, so as to obtain the oxide solid solution powder. In the present invention, a particle size of the oxide solid solution powder is preferably 10-25 nm and more preferably 15-20 nm.

In the present invention, the first calcination and the second calcination are preferably conducted in air.

In the present invention, after the oxide solid solution powder is obtained, the oxide solid solution powder is preferably subject to selective nitridation reaction, to obtain titanium nitride-reinforced ZTA ceramic powder.

In the present invention, the temperature of the selective nitridation reaction is preferably 800-1200° C. and more preferably 900-1000° C. In the present invention, the temperature of the reaction between Al2O3 and nitrogen gas, ZrO2 and nitrogen gas, and Y2O3 and nitrogen gas is relatively high and all is higher than 1300° C. Therefore, in the present invention, the temperature of the selective nitridation reaction is controlled to allow only TiO2 to be nitrided.

In the present invention, a nitridation reagent for the selective nitridation reaction is preferably ammonia gas. In the present invention, there is no special limitation on a device for the selective nitridation reaction; and any device well known to persons skilled in the art may be chosen. In the present invention, specifically, the oxide solid solution powder is placed in an alumina ceramic boat; the alumina ceramic boat is then placed in a vacuum tube-type high-temperature electric furnace; and high-purity flowing ammonia gas is introduced for the selective nitridation reaction.

The present invention further provides the titanium nitride-reinforced ZTA ceramic powder prepared by the preparation method mentioned above.

For better understanding of the present invention, content of the present invention is further illuminated below with reference to embodiments. However, the content of the present invention is not limited to the following embodiments.

Embodiment 1

Zirconium oxychloride ($ZrOCl_2.8H_2O$), aluminum chloride ($AlCl_3$), yttrium chloride ($YCl_3$), and titanium sulfate ($Ti(SO_4)_2$) were added to water to prepare a mixed aqueous solution, where a molar ratio of aluminum chloride, zirconium oxychloride, and titanium sulfate was 60:25:15, and a molar ratio of zirconium oxychloride to yttrium chloride was 98.5:3. After they are mixed with water evenly, ammonia water was added to the mixed aqueous solution. The solution was fully stirred for precipitation, and then was filtered. Obtained precipitate was washed with water and anhydrous ethanol successively, and dried to obtain hydroxide precipitate powder. The obtained hydroxide precipitate powder was calcined in air at 700° C. for 9 h, and further calcined at 900° C. for 1 h, so as to obtain oxide solid solution powder ($Al_2O_3$, $ZrO_2$, $Y_2O_3$, and $TiO_2$). The $Al_2O_3$—$ZrO_2$—$Y_2O_3$—$TiO_2$ solid solution powder was placed in a 99% alumina ceramic boat; the alumina ceramic boat was then placed in a vacuum tube-type high-temperature electric furnace; and high-purity flowing ammonia gas was introduced for selective nitridation reaction at high temperature, where the reaction temperature was 900° C. and the reaction time was 5 h, so as to obtain titanium nitride-reinforced ZTA ceramic powder.

FIG. 1 is an X-ray diffraction pattern of titanium nitride-reinforced ZTA ceramic powder prepared in Embodiment 1. It can be seen from FIG. 1 that, a particle size of the titanium nitride-reinforced ZTA ceramic powder prepared in Embodiment 1 is approximately 94 nm.

A ceramic material prepared by hot-pressing sintering of the alumina ceramic powder prepared in Embodiment 1 has hardness of 25 GPa and an abrasive ratio of 3000:1, and has good electrical conductivity.

Embodiment 2

Zirconium oxychloride (ZrOCl2.8H2O), aluminum nitrate (AlNO3), yttrium nitrate (Y(NO3)3), and titanium sulfate (Ti(SO4)2) were added to water to prepare a mixed aqueous solution, where a molar ratio of zirconium oxychloride, aluminum nitrate, and titanium sulfate was 60:25:15, and a molar ratio of zirconium oxychloride to yttrium nitrate was 97.5:3. After they are mixed with water evenly, ammonia water was added to the mixed aqueous solution. The solution was fully stirred for precipitation, and then was filtered. Obtained precipitate was washed with water and anhydrous ethanol successively, and dried to obtain hydroxide precipitate powder. The obtained hydroxide precipitate powder was calcined in air at 700° C. for 9 h, and further calcined at 900° C. for 1 h, so as to obtain oxide solid solution powder (Al2O3, ZrO2, Y2O3, and TiO2). The Al2O3-ZrO2-Y2O3-TiO2 solid solution powder was placed in a 99% alumina ceramic boat; the alumina ceramic boat was then placed in a vacuum tube-type high-temperature electric furnace; and high-purity flowing ammonia gas was introduced for selective nitridation reaction at high temperature, where the reaction temperature was 900° C. and the reaction time was 5 h, so as to obtain titanium nitride-reinforced ZTA ceramic powder.

A ceramic material prepared by hot-pressing sintering of the alumina ceramic powder prepared in Embodiment 2 has hardness of 35 GPa and an abrasive ratio of 6000:1, and has high good electrical conductivity.

Embodiment 3

Zirconium oxychloride (ZrOCl2.8H2O), aluminum chloride (AlCl3), yttrium chloride (YCl3), and titanium sulfate (Ti(SO4)2) were added to water to prepare a mixed aqueous solution, where a molar ratio of zirconium oxychloride, aluminum chloride, and titanium sulfate was 50:30:20, and a molar ratio of zirconium oxychloride to yttrium chloride was 98.5:3. After they are mixed with water evenly, ammonia water was added to the mixed aqueous solution. The solution was fully stirred for precipitation, and then was filtered. Obtained precipitate was washed with water and anhydrous ethanol successively, and dried to obtain hydroxide precipitate powder. The obtained hydroxide precipitate powder was calcined in air at 700° C. for 9 h, and further calcined at 900° C. for 1 h, so as to obtain oxide solid solution powder (Al2O3, ZrO2, Y2O3, and TiO2). The Al2O3-ZrO2-Y2O3-TiO2 solid solution powder was placed in a 99% alumina ceramic boat; the alumina ceramic boat was then placed in a vacuum tube-type high-temperature electric furnace; and high-purity flowing ammonia gas was introduced for selective nitridation reaction at high temperature, where the reaction temperature was 950° C. and the reaction time was 1 h, so as to obtain titanium nitride-reinforced ZTA ceramic powder.

A ceramic material prepared by hot-pressing sintering of the alumina ceramic powder prepared in Embodiment 3 has hardness of 30 GPa and an abrasive ratio of 5000:1, and has good electrical conductivity.

The foregoing descriptions provide only preferred implementations of the present invention. It should be noted that for a person of ordinary skill in the art, several improvements and modifications may further be made without departing from the principle of the present invention. These improvements and modifications should also be deemed as falling within the protection scope of the present invention.

The invention claimed is:

1. A preparation method of titanium nitride-reinforced zirconia toughened alumina (ZTA) ceramic powder, comprising the following steps:
   (1) mixing an aluminum salt, a zirconium salt, a yttrium salt, and a titanium salt with water to obtain a mixed aqueous solution, wherein the aluminum salt, the zirconium salt, the yttrium salt, and the titanium salt are water-soluble inorganic salts;
   (2) mixing the mixed aqueous solution obtained in step (1) and an alkaline precipitant for precipitation, to obtain hydroxide precipitate powder;
   (3) successively conducting a first calcination and a second calcination on the hydroxide precipitate powder obtained in step (2), to obtain oxide solid solution powder, wherein the temperature of the first calcination is 700-850° C. and the time of the first calcination is 6-12 h; and the temperature of the second calcination is 900-1000° C. and the time of the second calcination is 1-3 h; and
   (4) subjecting the oxide solid solution powder obtained in step (3) to a selective nitridation reaction, to obtain a titanium nitride-reinforced ZTA ceramic powder.

2. The preparation method according to claim 1, wherein in step (1), the aluminum salt comprises aluminum chloride, aluminum sulfate, or aluminum nitrate; the zirconium salt comprises zirconium oxychloride or zirconium citrate; the yttrium salt comprises yttrium chloride, yttrium nitrate, or yttrium sulfate; and the titanium salt comprises titanium sulfate, titanium chloride, or titanium nitrate.

3. The preparation method according to claim 1, wherein in step (1), a molar ratio of aluminum in the aluminum salt, zirconium in the zirconium salt, yttrium in the yttrium salt, and titanium in the titanium salt is (10-30):(30-70):(0.4-1):(5-20).

4. The preparation method according to claim 2, wherein in step (1), a molar ratio of aluminum in the aluminum salt, zirconium in the zirconium salt, yttrium in the yttrium salt, and titanium in the titanium salt is (10-30):(30-70):(0.4-1):(5-20).

5. The preparation method according to claim 1, wherein in step (2), the alkaline precipitant is ammonia water or ammonium chloride.

6. The preparation method according to claim 1, wherein after precipitation, step (2) further comprises conducting a solid-liquid separation on the system, and drying a solid substance obtained after the solid-liquid separation, to obtain the hydroxide precipitate powder.

7. The preparation method according to claim 6, wherein the drying temperature is 75-85° C.

8. The preparation method according to claim 1, wherein the temperature of the selective nitridation reaction in step (4) is 800-1200° C.

* * * * *